No. 881,782. PATENTED MAR. 10, 1908.
G. F. ELLIOTT.
INTRENCHING TOOL.
APPLICATION FILED APR. 24, 1907.

2 SHEETS—SHEET 1.

Witnesses Inventor
George F. Elliott
Attorneys

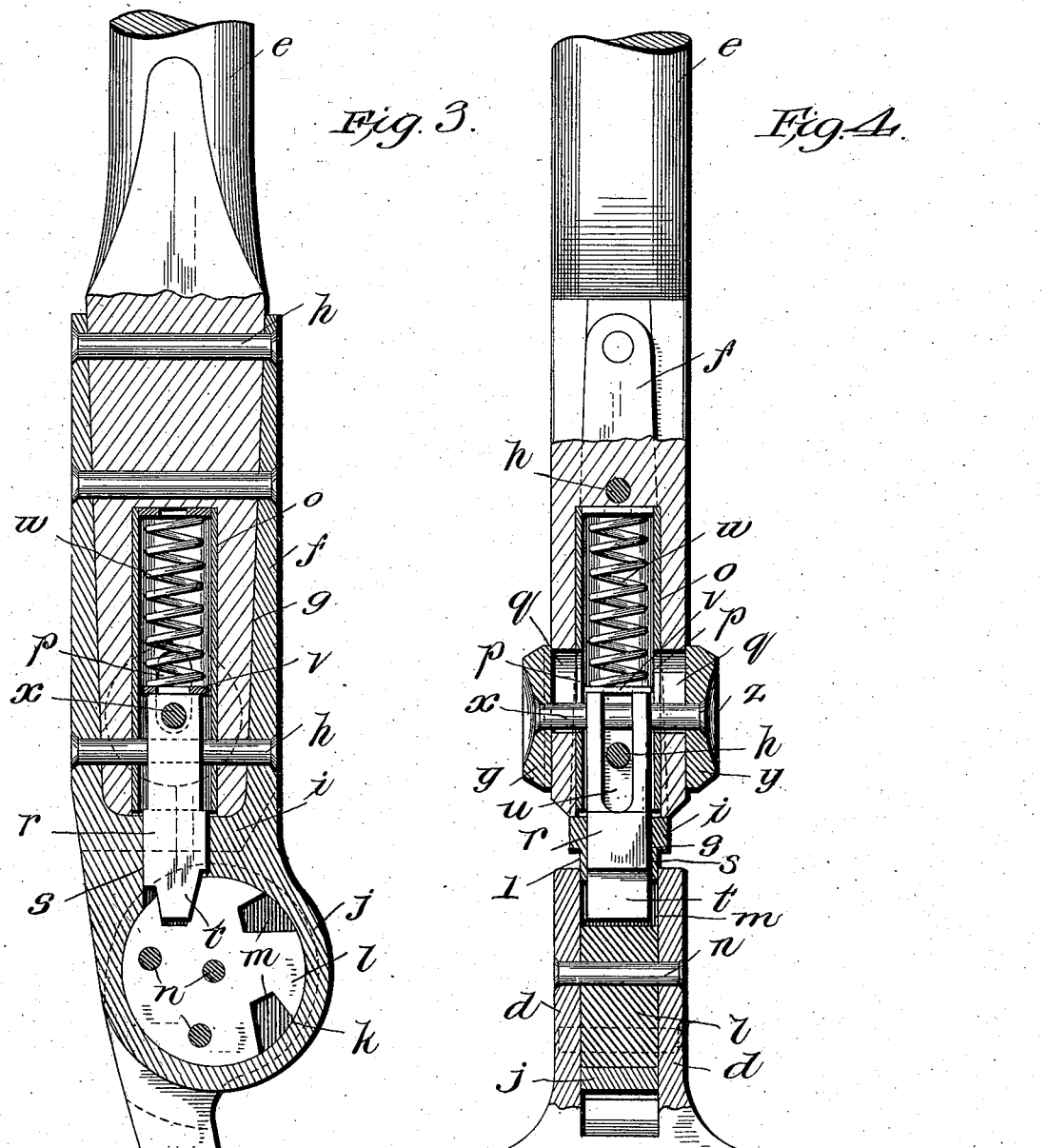

UNITED STATES PATENT OFFICE.

GEORGE F. ELLIOTT, OF THE UNITED STATES MARINE CORPS.

INTRENCHING-TOOL.

No. 881,782.   Specification of Letters Patent.   Patented March 10, 1908.

Application filed April 24, 1907. Serial No. 370,072.

*To all whom it may concern:*

Be it known that I, GEORGE F. ELLIOTT, brigadier general United States Marine Corps, stationed at Washington, District of Columbia, a citizen of the United States, have invented certain new and useful Improvements in Intrenching-Tools; and I do hereby declare the following to be a full, clear, and exact description of the invention, such as will enable others skilled in the art to which it appertains to make and use the same.

This invention relates to improvements in implements for use in the field, and is especially designed to comprise an adjustable spade, hoe, or analogous implement which may be briefly referred to as a combination intrenching tool, but the broad idea of the invention itself may be equally as well applied to similarly operating tools used in other connections, such, for instance, as post-hole diggers, and the like.

In implements of this character means are provided for holding a spade securely in any one of several adjusted positions, and the primary object of the present invention is to provide interlocking means between the handle and the blade which are protected from dirt and thus preventing the locking mechanism from being clogged up and thereby rendering the implement less effective.

In my former patent, No. 856,575, patented June 11, 1907, means were provided which coöperated to eject any accumulated dirt in the notches forming a part of the interlocking mechanism, but by the present construction, it is aimed to prevent in the first instance the accumulation of dirt. In that application the notches before referred to were formed on the periphery of spaced plates carried at the upper end of the blade, which spaced plates received a tongue member carried by the handle of the implement, but in the present invention the notches, corresponding to the notches of the application above referred to, are located between such plates and may be formed upon the periphery of a member rotating within an annular chamber formed in a tongue member carried by the socket of the handle, which tongue member is contained between the spaced plates carried at the top of the blade.

While it will be understood that I do not limit myself to the details shown and described, for the purpose of disclosure, reference is had to the accompanying drawings, illustrating a practical embodiment of the invention, in which like letters designate the same parts in the several views, and in which:—

Figure 1:
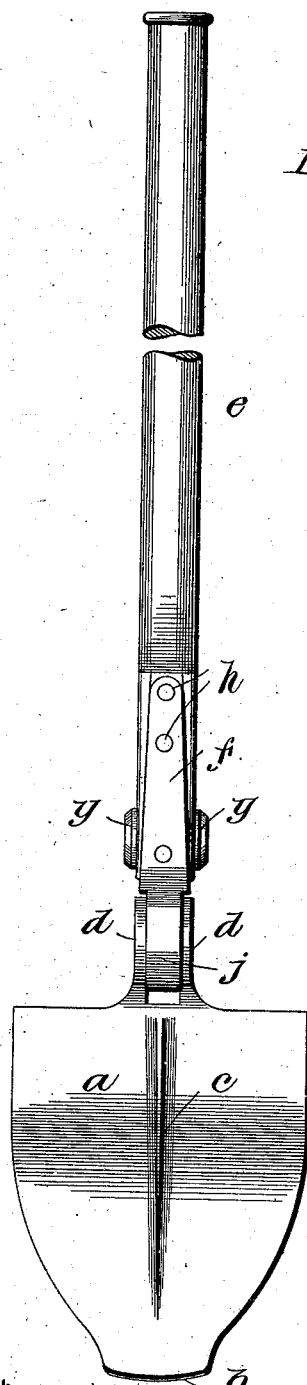
Figure 2:
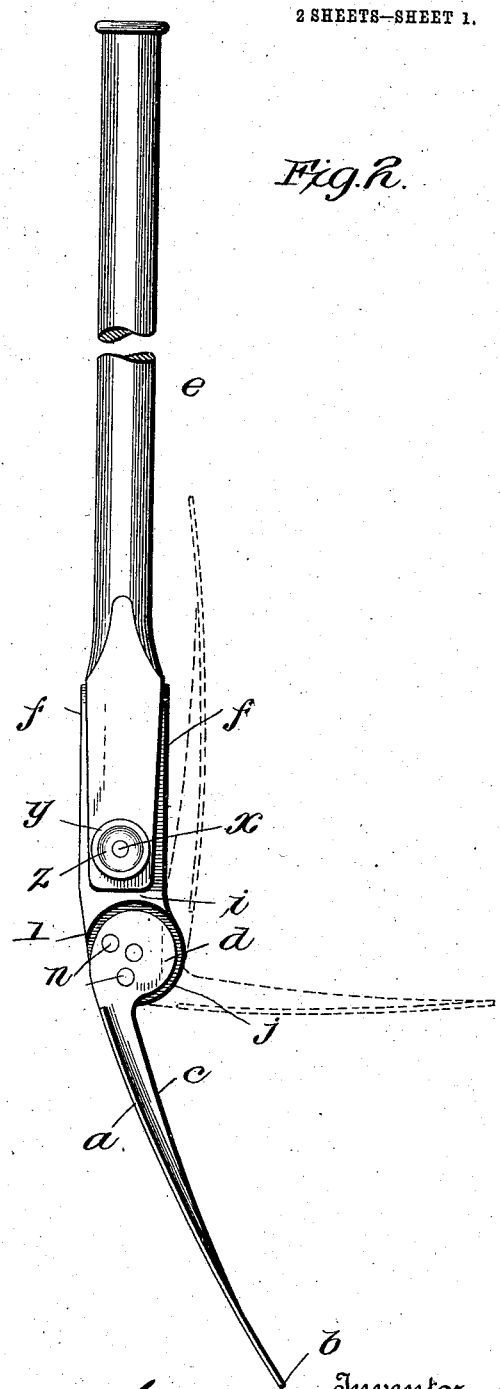

Figure 1 is a front elevation of the implement, the blade thereof being locked in a position utilizable as a spade. Fig. 2 is a view in side elevation, the blade being shown in dotted lines in a horizontal position, in which position it may be utilizable as a hoe or chopping implement, and being also shown in dotted lines, folded up against the handle, or in its closed position for carrying. Fig. 3 is a longitudinal section, on an enlarged scale, taken substantially centrally of the blade and socket, and the handle and the blade being shown broken away, and Fig. 4 is a longitudinal central section taken on a plane at right angles to Fig. 3.

As the present invention resides particularly in the interlocking means between the blade and handle, the advantages and functions of the special shape of the blade and the advantages and functions of the implement proper will only be briefly referred to, reference being had to the aforesaid patent for a fuller description.

$a$ designates a blade having a sharp reduced cutting edge $b$, which blade is centrally reinforced longitudinally as at $c$ and terminates at its upper end in the projecting ears or spaced plates $d$, which may be formed integral with the blade, as shown, or which may be formed as a part of a detachable reinforcing member, as illustrated in my aforesaid patent.

The implement is provided with a handle having a tongue portion provided with an annular recess or socket in the lower end thereof adapted to project within the spaced plates $d$. In the drawings, this handle is shown as comprising the wooden upper portion $e$ carrying at its lower end a socket member, formed from spaced jaws the interior face of which may be beveled as at $g$ to receive the wedge-shaped end of the handle $e$ which is firmly secured therein by means of cross bolts or rivets $h$.

The lower end of the socket member is provided with the transverse wall $i$ below which depends the tongue portion $j$ comprising an annular strap forming an internal socket, recess or bearing $k$ for the reception of a rotatably mounted block $l$ adapted to turn within the strap $j$, bearing on the inner face thereof, and which block is provided with a plurality of notches $m$ formed around its periphery and adapted to become interlocked with a locking bolt hereinafter referred to.

In its assembled position, the notched block $l$ is contained within the strap or recessed tongue $j$, which latter is held between the spaced plates $d$ by means of pins $n$ passing through the plates $d$ and the block $l$, as clearly indicated in Figs. 3 and 4, which interlocks the blades to the block $l$ in such manner that the block $l$ forms a hub or pivotal bearing for the blade. The lower end of the handle $e$ is bored and is preferably provided with a cylindrical liner $o$, slotted at opposite positions as at $p$ to aline with slots $q$ disposed laterally of the handle. Within this bored end or its liner $o$ is a longitudinally reciprocating locking bolt $r$ passing at its lower end through an opening $s$ formed in the cross piece $i$ and provided with a locking tooth $t$ which may be reduced and beveled to coöperate with the notches $m$ of the hub block $l$. The upper end of the bolt is slotted as at $u$ (Fig. 4) to straddle the lower rivet or bolt $h$ binding the jaws $f$ to the handle $e$. The upper end of the bolt may also carry a plate or washer $v$ superposing a coil spring $w$ bearing at its upper end against the closed end of the bore or liner $o$.

$x$ is a transverse operating pin passing through the upper end of the bolt and carrying at its ends buttons $y$ sliding on the sides of the handle $l$, which buttons may be formed on their outside faces with concave depressions $z$ to receive the thumb and a finger for ease in manipulation, it being observed that the operating pin $x$ passes through the slots $p$ and $q$ and is free to ride therein against the tension of the spring $w$. It will also be observed that the hollow tongue or strap portion $j$ is reduced laterally to form recessed faces 1 with the jaw members $f$ to snugly fit within the spaced plates $d$ and also that the hub block $l$ is of such a circumference as to snugly fit within the strap $j$.

Having thus described the invention, what I claim is:—

1. The combination with a handle provided with an annularly inclosed recess, of a blade carrying a rotatably mounted member contained within said recess and completely encircled by the peripheral wall thereof, and means for locking said member in any one of several adjusted positions, substantially as described.

2. The combination with a handle provided with an annularly inclosed recess, of a blade carrying a rotatably mounted member contained within said recess and completely encircled by the peripheral wall thereof, and means for locking said member in any one of several adjusted positions, comprising a locking tooth carried by said handle and coöperating with notches formed on said rotatably mounted member, substantially as described.

3. The combination with a handle provided with an annularly inclosed recess, of a blade carrying a rotatably mounted member contained within said recess and completely encircled by the peripheral wall thereof, and means for locking said member in any one of several adjusted positions, comprising a locking tooth carried by said handle and coöperating with notches formed on the periphery of said rotatably mounted member, substantially as described.

4. The combination with a handle provided with an annularly-inclosed recess at its lower end, of a plate carrying a rotatably-mounted member contained within said recess and completely encircled by the wall thereof, and means for locking said member in any one of several adjusted positions, comprising a longitudinally sliding locking tooth mounted on said handle and coöperating with notches formed on the periphery of said rotatably-mounted member, substantially as described.

5. The combination with a handle, of a socket member therefor terminating in an annular strap, a blade carrying an annular rotatably mounted member inclosed within and snugly bearing against said strap and completely encircled by the peripheral wall thereof, and means for locking said member in any one of several adjusted positions, substantially as described.

6. The combination with a handle, of a socket member therefor terminating in an annular strap, a blade carrying an annular rotatably mounted member inclosed within and snugly bearing against said strap and completely encircled by the peripheral wall thereof, and means for locking said member in any one of several adjusted positions, comprising a locking tooth carried by said handle and coöperating with notches formed in said rotatably mounted member, substantially as described.

7. The combination with a handle, of a socket member therefor terminating in an annular strap, a blade carrying an annular rotatably mounted member inclosed within and snugly bearing against said strap and completely encircled by the peripheral wall, and means for locking said member in any one of several adjusted positions, comprising a locking tooth carried by said handle and coöperating with notches formed in the periphery of said rotatably mounted member, substantially as described.

8. The combination with a handle provided with a tongue having an annular recess formed therein, of a blade and spaced plates projecting from said blade, receiving and forming side plates for said annularly recessed tongue, a rotatably mounted member inclosed within said annular recess, means securing said member to said projecting plates, and means for locking said member in any one of several adjusted positions, substantially as described.

9. The combination with a handle provided with a tongue having an annular recess formed therein, of a blade and spaced plates projecting from said blade, receiving and forming side plates for said annularly recessed tongue, a rotatably mounted member inclosed within said annular recess, means securing said member to said projecting plates, and means for locking said member in any one of several adjusted positions, comprising a locking tooth carried by said handle and coöperating with notches formed on said rotatably mounted member, substantially as described.

10. The combination with a handle provided with a tongue having an annular recess formed therein, of a blade and spaced plates projecting from said blade, receiving and forming side plates for said annularly recessed tongue, a rotatably mounted member inclosed within said annular recess, means securing said member to said projecting plates, and means for locking said member in any one of several adjusted positions, comprising a locking tooth carried by said handle and coöperating with notches formed on the periphery of said rotatably mounted member, substantially as described.

11. The combination with a handle, of a socket member therefor terminating in an annular strap, a blade and spaced plates projecting from said blade, receiving and forming side plates for said annular strap, a rotatably mounted member inclosed within said annular strap, means securing said member to said projecting plates, and means for locking said member in any one of several adjusted positions, substantially as described.

12. The combination with a handle, of a socket member therefor, comprising longitudinal jaws provided with a bottom wall and terminating in an annular strap, the said jaws adapted to receive the end of the handle, a blade carrying a rotatably mounted member inclosed within said strap and provided with a plurality of notches on its periphery, and a spring controlled locking bolt disposed within a bore formed in said handle and projecting through an aperture formed in the bottom of said socket member, said bolt coöperating with said notched member to lock same in any one of several positions of adjustment, substantially as described.

13. The combination with a handle provided with a beveled end, of a socket member therefor comprising spaced jaws beveled on their inside faces to receive the beveled end of said handle, said jaws terminating in an annular strap, a blade carrying a rotatably mounted hub member inclosed within said annular strap, and means coöperating with said hub member to interlock said blade to said handle in any one of several positions, substantially as described.

14. The combination with a handle provided with a bore in its lower end and having laterally disposed slots communicating with said bore, of a socket member for said handle comprising jaws terminating in an annular strap, means securing said jaws to said handle, a blade having projecting spaced plates inclosing said annular strap, a rotatably mounted hub member inclosed within said strap and rigidly secured to said projecting plates, said hub member being provided on its periphery with a plurality of notches, a spring controlled interlocking bolt working in said bore and coöperating with the notches of said hub member to lock same in any one of several positions, and an operating pin secured to said locking bolt and passing through the transverse slots of said handle and provided with finger buttons, substantially as described.

In testimony whereof I affix my signature in presence of two witnesses.

GEORGE F. ELLIOTT.

Witnesses:
H. C. WILSON,
N. CURTIS LAMMOND.